US010151444B1

(12) United States Patent
Tsai et al.

(10) Patent No.: US 10,151,444 B1
(45) Date of Patent: Dec. 11, 2018

(54) ELECTROMECHANICAL FREE PROMPT LIGHT

(71) Applicant: THUNDEROUS SOUNDERS ELECTRONIC LTD., New Taipei (TW)

(72) Inventors: Shao-Hua Tsai, Kaohsiung (TW); Yuan-Chun Hsu, Tainan (TW)

(73) Assignee: THUNDEROUS SOUNDERS ELECTRONICS LTD., New Taipei (TW)

( * ) Notice: Subject to any disclaimer, the term of this patent is extended or adjusted under 35 U.S.C. 154(b) by 0 days.

(21) Appl. No.: 15/657,660

(22) Filed: Jul. 24, 2017

(51) Int. Cl.

| | |
|---|---|
| ***G02F 1/1335*** | (2006.01) |
| ***F21V 7/00*** | (2006.01) |
| ***F21V 19/00*** | (2006.01) |
| ***F21V 7/22*** | (2018.01) |
| ***F21V 3/00*** | (2015.01) |
| *F21Y 115/10* | (2016.01) |

(52) U.S. Cl.
CPC .............. *F21V 7/0083* (2013.01); *F21V 3/00* (2013.01); *F21V 7/22* (2013.01); *F21V 19/0015* (2013.01); *F21Y 2115/10* (2016.08)

(58) Field of Classification Search
CPC .. F21S 10/06; F21S 9/022; F21S 43/14; F21S 43/30; F21V 7/0025; F21V 7/0083; F21V 13/04; F21V 29/75; F21V 29/77; F21V 19/0015; F21V 7/22; F21V 3/00; G08G 1/0955; B60Q 1/2611
USPC .......................................................... 362/235
See application file for complete search history.

(56) References Cited

U.S. PATENT DOCUMENTS

| | | | | | |
|---|---|---|---|---|---|
| 4,105,286 | A * | 8/1978 | Curran | B62J 6/20 | 359/522 |
| 5,694,112 | A * | 12/1997 | Vannrox | B60Q 1/2611 | 340/468 |
| 6,879,263 | B2 * | 4/2005 | Pederson | B60Q 1/2611 | 340/815.45 |
| 7,344,266 | B2 * | 3/2008 | Coman | E01F 9/559 | 362/153 |
| 7,445,348 | B2 * | 11/2008 | Shimada | G02B 5/0858 | 359/584 |
| 7,473,019 | B2 * | 1/2009 | Laski | G02F 1/133603 | 362/308 |
| 7,607,803 | B2 * | 10/2009 | Zhang | F21K 9/00 | 362/294 |
| 7,616,381 | B2 * | 11/2009 | Shen | G02B 27/283 | 359/629 |

(Continued)

FOREIGN PATENT DOCUMENTS

CN 205245076 U 5/2016

*Primary Examiner* — Clude J Brown
(74) *Attorney, Agent, or Firm* — Muncy, Geissler, Olds & Lowe, P.C.

(57) ABSTRACT

An electromechanical free prompt light includes a direction divider, a carrier base and a light emitting module. The direction divider includes a main body, and a plurality of reflecting plates in a radial arrangement by regarding the main body as a center. The carrier base includes a platform for erecting the main body, and a plurality of direction divided regions jointly defined by every two adjacent reflecting plates and the platform. The light emitting module includes a plurality of light sources disposed correspondingly to the direction divided regions, respectively, and a controller electrically connected to the light sources.

12 Claims, 5 Drawing Sheets

(56) References Cited

U.S. PATENT DOCUMENTS

| | | | | |
|---|---|---|---|---|
| 7,637,628 | B2 * | 12/2009 | Budike | F21K 9/00 362/247 |
| 7,780,534 | B2 * | 8/2010 | Wudtke | G07F 17/3211 463/16 |
| 8,096,677 | B2 * | 1/2012 | Fields | B64F 1/20 362/231 |
| 8,353,606 | B2 * | 1/2013 | Jeong | F21S 2/005 362/218 |
| 9,228,713 | B2 * | 1/2016 | Skertich, Jr. | F21V 5/04 |
| 2010/0244748 | A1 * | 9/2010 | Haab | B60Q 1/2611 315/313 |
| 2014/0104054 | A1 * | 4/2014 | Weeks | B60Q 1/2611 340/468 |
| 2017/0365136 | A1 * | 12/2017 | Torre Sarmiento | F21K 9/68 |

* cited by examiner

ELECTROMECHANICAL FREE PROMPT LIGHT

FIELD OF THE INVENTION

The present invention relates to an electromechanical free prompt light, and particularly, to an electromechanical free prompt light that achieves rotating and glittering effects without involving a mechanical operation.

BACKGROUND OF THE INVENTION

To prevent hazards or keep personnel safe, devices such as warning lights or indication lights are often seen in construction sites, public places and factories, or on machines. These devices allow viewers to see areas with potential dangers, or serve as guidance for escape routes in fire scenes. Current light prompt devices are usually categorized into two types—electromechanical rotating, and simulated rotating. In the electromechanical rotating type, a bowl-shaped reflection mirror is disposed at the proximity of a light source to perform circular motions, so as to cause the light source to appear as emitting light and being blocked in turn at different viewing points to generate a rotating visual effect. In the simulated rotating type, multiple light sources are disposed in different directions, and are caused to sequentially emit light to provide a viewer with a sensation of rotation.

For example, a utility model patent of the China Patent Publication CN205245076 discloses an electromechanical free light emitting device providing a rotating lighting effect. The device includes a circuit disposed with multiple light emitting modules, and multiple reflecting planes in a polygonal arrangement on the circuit board. Light beams emitted from one or several of the multiple light emitting modules are reflected by one of several of the multiple reflecting planes. The structure of the reflecting mirror of the utility model patent is complex, and, based on production considerations, may be manufactured by electroplating a reflective film on a reflection mirror structure formed by plastic injection. Alternatively, manufacturing the entire reflection mirror by forging is also a reasonable manufacturing method. However, with respect to the above approach, if the form or number of the reflecting planes needs to altered, corresponding molds need to be again manufactured for all components, hence leading to high production costs and complicated processes that disfavor product development. Further, this utility model patent uses an electroplated material as a reflecting base, which may reflect less uniform light beams, such that a visible range rendered may be smaller and the prompting effect may be diminished. Therefore, there is a need for a solution for overcoming the issues of the prior art.

SUMMARY OF THE INVENTION

It is an object of the present invention to solve the issues of high production costs and unsatisfactory visibility of the prior art.

To achieve the above object, the present invention provides an electromechanical free prompt light including a direction divider, a carrier base and a light emitting module. The direction divider includes a main body, and a plurality of reflecting plates in a radial arrangement by regarding the main body as a center. The carrier base includes platform for erecting the main body, and a plurality of direction divided regions jointly defined by every two adjacent reflecting plates and the platform. The light emitting module includes a plurality of light sources respectively corresponding to the direction divided regions, and a controller electrically connected to the light sources.

Further, the main body includes a plurality of slits correspondingly and radially open relative to the main body, and the reflecting plates are respectively disposed in the slits.

Further, the main body includes two valve bodies, and the slits are formed after the valve bodies are connected.

Further, the main body includes a plurality of claws distributed on each of the valve bodies, the claws on each of the valve bodies are symmetrical and are equal in quantity, and each of the slits is located between every two adjacent claws.

Further, each of the reflecting plates includes at least one opening, and the reflecting plates are embedded through the opening to form a radial form.

Further, the light sources are disposed on the platform, and emit light beams away from the platform.

Further, the carrier base includes a plurality of circuit boards respectively located in the direction divided regions and erecting on the platform, and the light sources are respectively disposed on the circuit boards and emit light beams away from the main body.

Further, the surface of the direction divider is coated by a reflective film.

Further, the electromechanical free prompt light further includes a lampshade. The lampshade is connected to a peripheral of the platform, covers the direction divider and the light sources, and is provided with an uniform surface.

Further, each of the light sources is a light emitting diode (LED).

Therefore, the present invention provides following effects compared to the prior art.

1. In the present invention, the light sources are separated by the reflecting plates, and so the manufacturing process of reflecting planes can be simplified and production costs can be reduced. Because the reflecting plates feature a high reflection rate, uniform light emitting surfaces and a light weight, in addition to increasing a visible area of the prompt light compared to a conventional technical solution of disposing a metal coating film on a reflector, the present invention further reduces the weight of a finished product.

2. In the present invention, the direction divider evenly secures the reflecting plates at different angles to separate the direction divided regions. More specifically, the direction divider is simple in structure, and allows a user to individually change the size of the angles of the direction divided regions according to requirements. Further, with the uniformity of the reflecting plates of the present invention, a visible area can be increased when a high-power LED is used. Moreover, with the good light separation effect of the reflecting plates, light beams are prevented from passing through to other parts of the prompt light to eliminate the issue of diminished simulated rotating lighting effect.

DETAILED DESCRIPTION OF THE PREFERRED EMBODIMENTS

Figure 1:
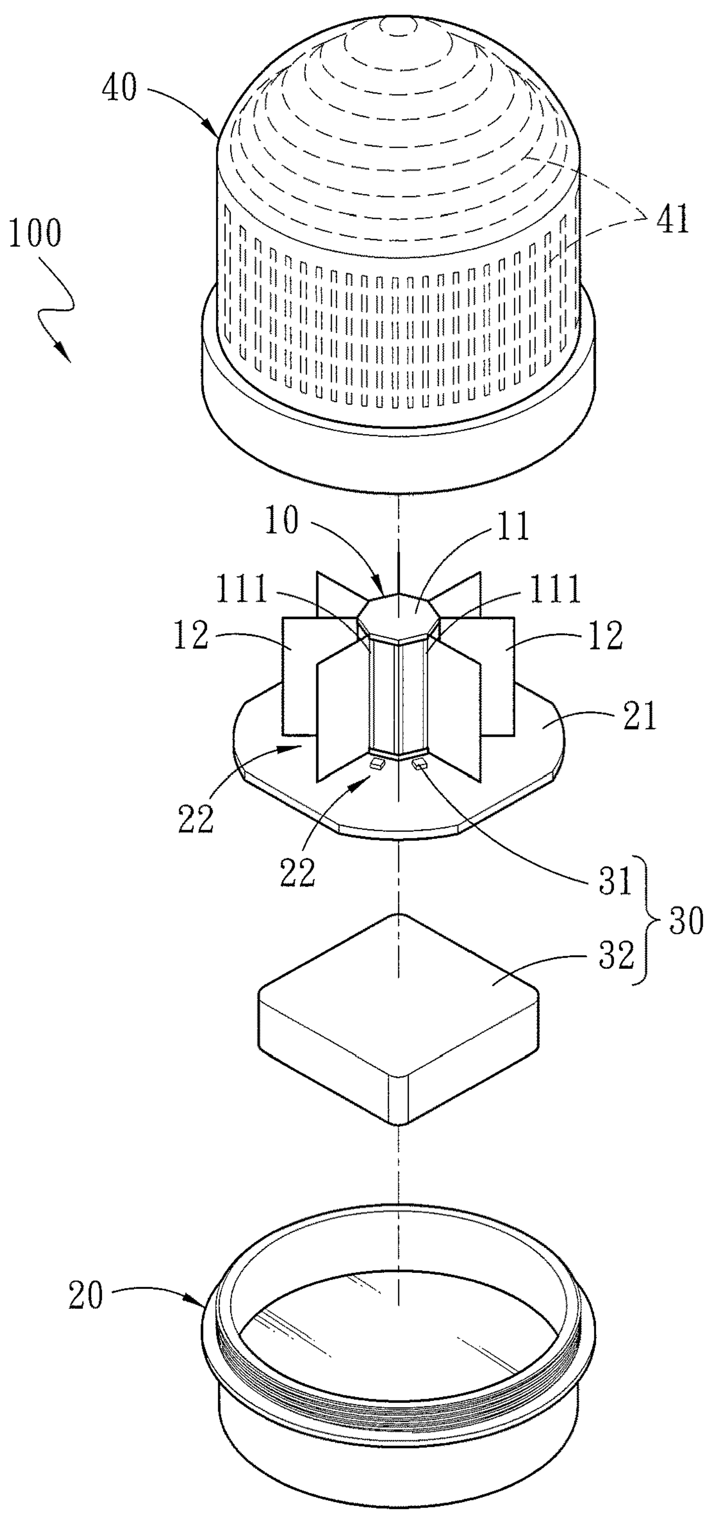
FIG. 1 is an exploded perspective view according to a first embodiment of the present invention.
Figure 2:
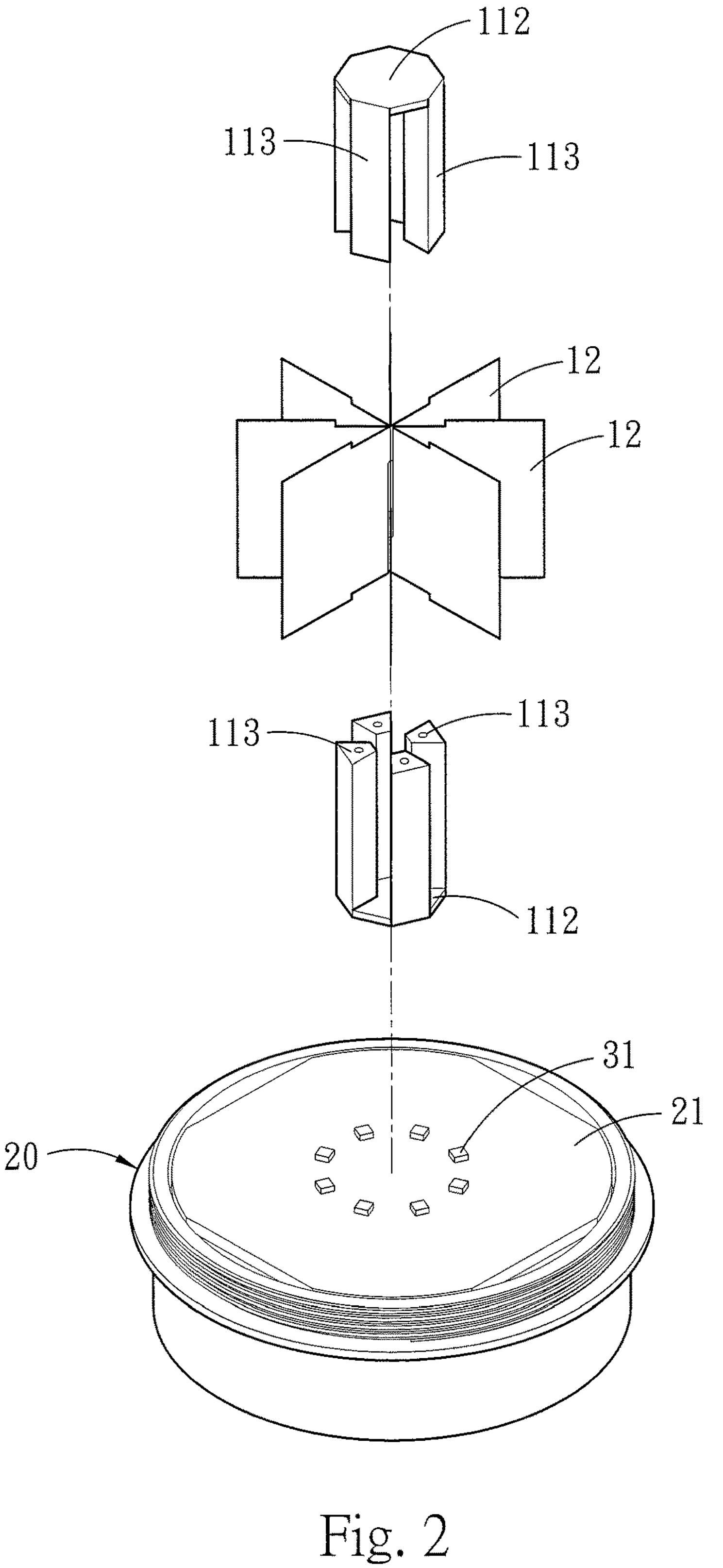
FIG. 2 is an exploded perspective view of a direction divider and a carrier base according to the first embodiment of the present invention.

Refer to FIG. 1 and FIG. 2 for technical contents of the present invention. The present invention provides an electromechanical free prompt light 100 including a direction divider 10, a carrier base 20 and a light emitting module 30. The electromechanical free prompt light 100 may serve as a warning light or a flashing light to provide a main function of attracting the attention of a viewer and to warn the viewer about hazardous environments with sharp objects, pit holes and fire, or other emergencies. It should be noted that, the above description provides examples for illustration purposes, and is not to be construed as limitations to the present invention.

More specifically, the direction divider 10 includes a main body 11, and a plurality of reflecting plates 12 in a radial arrangement by regarding the main body 11 as a center. In the present invention, each of the reflecting plates 12 may be made of PET to provide a reflection rate of above 90%. Because the material of the reflecting plates 12 is generally known to one person skilled in the art, and shall be omitted herein. Further, the surface of the direction divider 10 is coated with a reflective film to also reflect light beams that are not emitted to the reflecting plates 12.

The carrier base 20 includes a platform 21 for erecting the main body 11, and a plurality of direction divided regions 22 jointly defined by every two adjacent reflecting plates 12 and the platform 21. A circuit (not shown) may be arranged at a bottom portion of the platform 21. The term "the direction divided region 22" of the present invention refers to, after the platform 21 is geometrically divided into a plurality of planes, a block formed from three-dimensionally extending each of the plurality of divided planes. Meanwhile, each direction divided region 22 is a main light emitting region that a viewer observes when the viewers views the electromechanical free prompt light 100.

The light emitting module 30 includes a plurality of light sources disposed correspondingly to the direction divided regions 22, respectively, and a controller 32 electrically connected to the light sources 31. Preferably, each of the light sources 31 is a light emitting diode (LED). The controller 32 may be a single-chip controller 32, and is not limited by the present invention. According to the above structure, a user can, by setting the timing of the controller 32, control one or several of the light sources 31 to emit light in turn to simulate a rotating alert effect of a revolving light.

The structure of the present invention is described in detail below. Further, referring to FIG. 1, the light sources 31 are disposed on the platform 21, and emit light beams away from the platform 21. Because the distance between two adjacent reflecting plates 12 in each direction divided region 22 increases in a direction away from the main body 11, the light beams still propagate towards a direction away from the main body 11 after being reflected at any position of each of the reflecting plates 12, thereby producing a regional light emitting visual effect upon a viewer.

Figure 3:
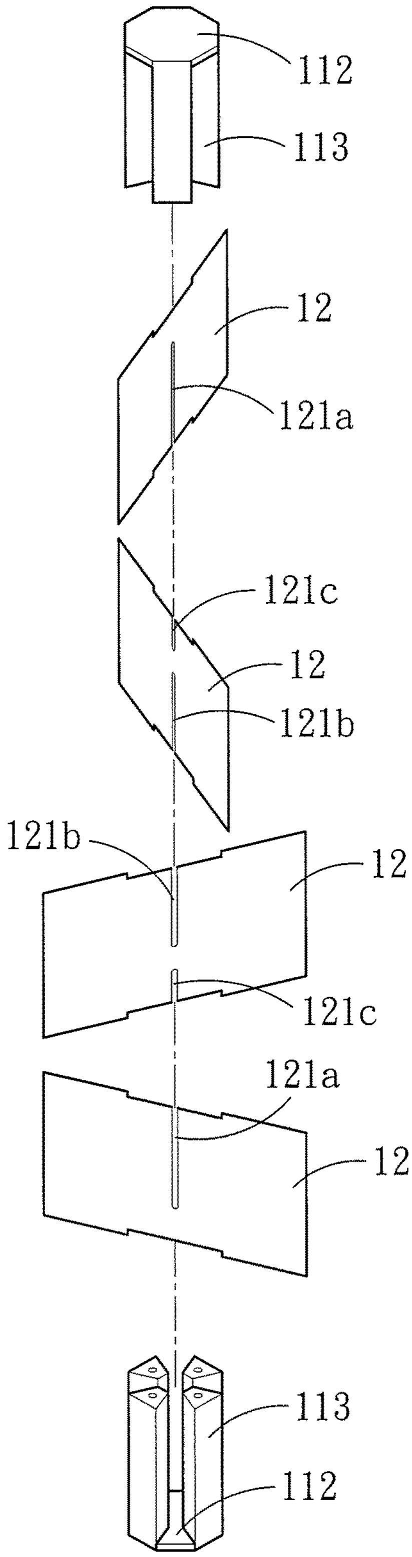
FIG. 3 is an exploded perspective view of a direction divider according to the first embodiment of the present invention.
Figure 4:
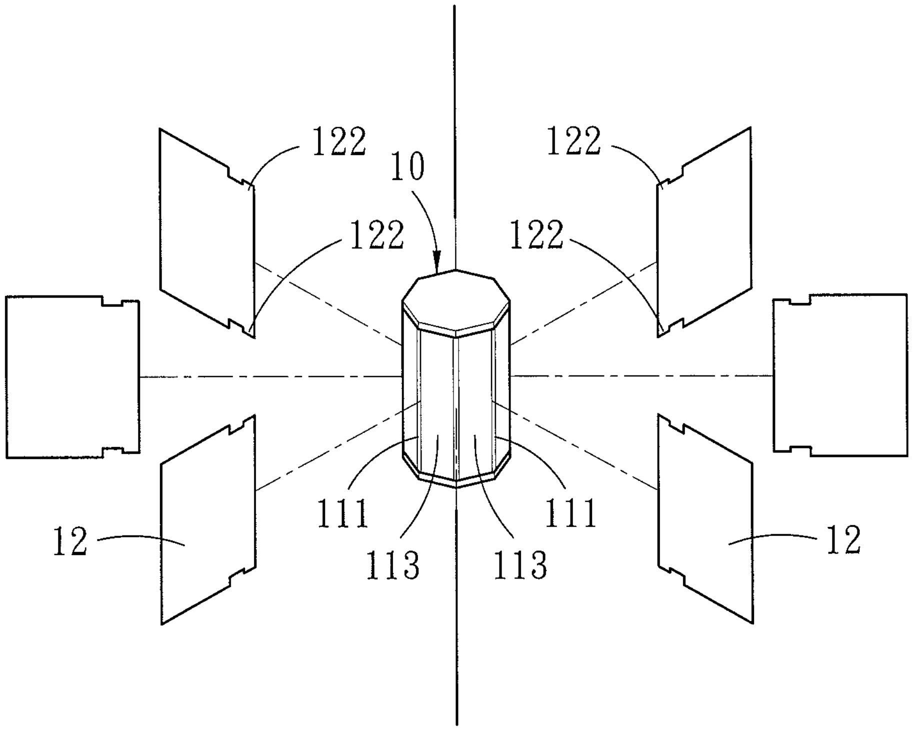
FIG. 4 is an exploded perspective view of a direction divider according to a second embodiment of the present invention.

Referring to FIG. 1 as well as FIG. 3, the main body 11 includes a plurality of slits 111, in which the reflecting plates 12 are respectively disposed. In this embodiment, a user may disassemble the main body 11 into two valve bodies 112, and the main body 11 further includes a plurality of claws 113 distributed on each of the valve bodies 112. The claws 113 on each of the valve bodies 112 are symmetrical and are equal in quantity, and each of the slits 111 is a gap between every two claws 113 after the two valve bodies 112 are assembled. A user may place the reflecting plates 12 at one side of the claws 113, respectively, and assemble and secure the two valve bodies 112, thus allocating the reflecting plates 12 at positions of different phase angles. The total number of the valve bodies 112 is not limited to two, and may be other numbers as long as the main body 11 can be disassembled to facilitate the assembly of the reflecting plates 12. In this embodiment, there are four reflecting plates 12, each of the valve bodies 112 includes four claws 113, and there are eight slits 111 surrounding the main body 11 after the main body 11 is assembled. Among the four reflecting plates 12, each of two reflecting plates 12 includes an opening 121*a*, and each of the other two reflecting plates 12 includes two openings 121*b* and 121*c*. Thus, the reflecting plates 12 may be dual embedded through the openings 121*a*, 121*b* and 121*c* to form a radial form. As shown in FIG. 4, in a second embodiment of the present invention, the reflecting plates 12 may be insertingly placed in the slits 111 in an inserted manner, respectively, and be secured at inner sides of the slits 111 by corresponding to flanges 122 of the slits 111, respectively.

Figure 5:
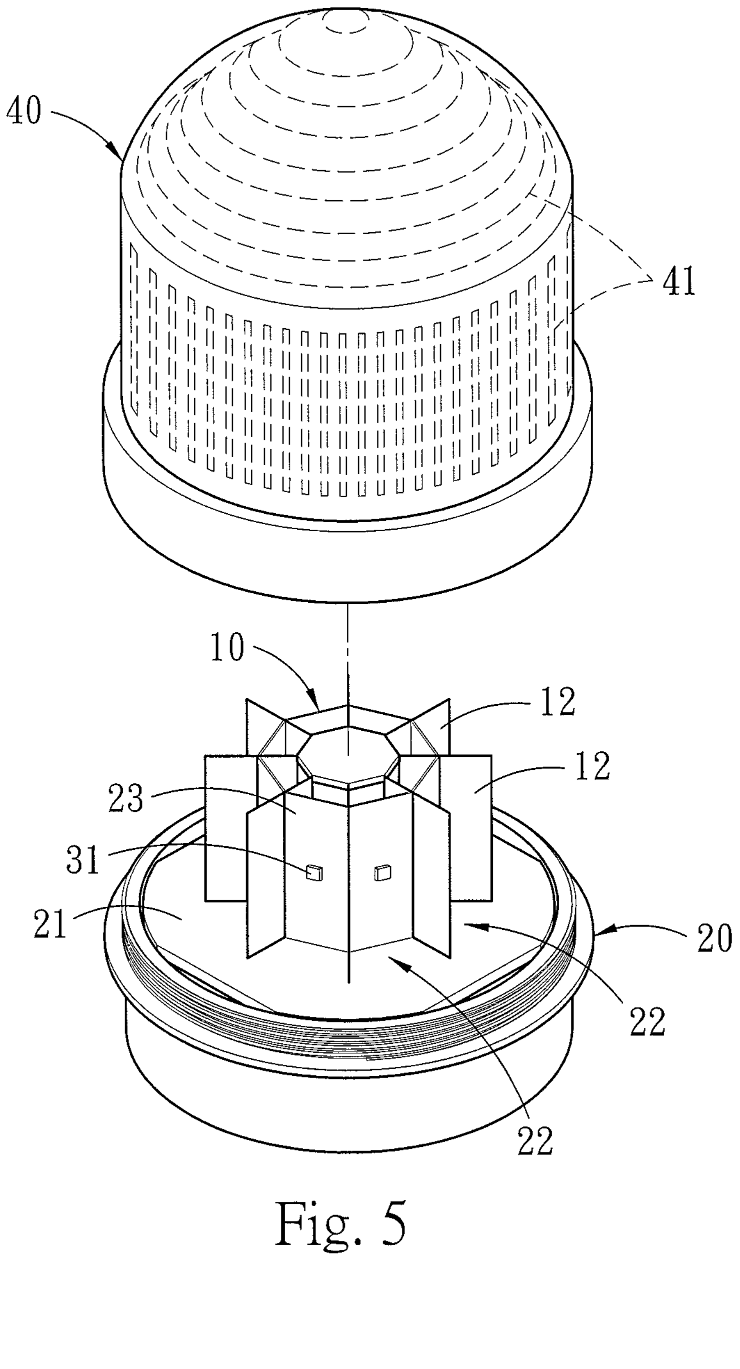
FIG. 5 is an exploded perspective view according to a third embodiment of the present invention.

Referring to FIG. 5, in another embodiment, the carrier base 20 includes a plurality of circuit boards 23 respectively located in the direction divided regions 22 and erecting on the platform 21. The light sources 31 are respectively disposed on the circuit boards 23, and emit light beams away from the main body 11 to similarly achieve an effect of directionally projecting the light beams.

Further, to provide a more ideal warning lighting effect, the electromechanical free prompt light 100 further includes a lampshade 40. The lampshade 40 is connected to the periphery of the platform 21, and covers the direction divider 10 and the light sources 31. The lampshade 40 includes at an inner edge a plurality of prisms 41, which again converge and focus the light beams respectively diffused from the direction divided regions 22 to enhance visibility. Further, the present invention may adopt a high-power LED as each of the light sources 31, and the lampshade 40 may be provided with a uniform surface (not shown) to cause a light transmissive surface of the lampshade 40 to form multiple micro reflecting planes to uniformly emit and scatter the light beams. The term "uniform surface" of the present invention may be realized by adding a uniformity agent or uniformity powder into the lampshade 40, or performing a texture atomization treatment on the surface of a mold of the lampshade 40. Because the intensity of illumination emitted from the light sources 31 is higher than common LEDs, sufficient brightness is still preserved even if the uniform surface of the lampshade 40 is slightly attenuated, hence achieving the effect of increasing the visible area when the light beams reflected from the direction divided regions are emitted to the uniform surface of the lampshade 40.

What is claimed is:

1. An electromechanical free prompt light, comprising:

a direction divider, comprising a main body, and a plurality of reflecting plates in a radial arrangement by regarding the main body as a center;

a carrier base, comprising a platform for erecting the main body, and a plurality of direction divided regions jointly defined by every two of the reflecting plates and the platform; and a light emitting module, comprising a plurality of light sources disposed correspondingly to the direction divided regions, respectively, and a controller electrically connected to the light sources, wherein the main body comprises a plurality of slits correspondingly and radially open relative to the main body, and the reflecting plates are respectively disposed in the slits.

2. The electromechanical free prompt light of claim 1, wherein each of the reflecting plates comprises at least one opening, and the reflecting plates are embedded through the openings to form a radial form.

3. The electromechanical free prompt light of claim 1, wherein the main body further comprises two valve bodies, and the slits are formed after the valve bodies are connected.

4. The electromechanical free prompt light of claim 3, wherein each of the reflecting plates comprises at least one opening, and the reflecting plates are embedded through the openings to form a radial form.

5. The electromechanical free prompt light of claim 3, wherein the main body further comprises a plurality of claws distributed on each of the valve bodies, the claws on each of the valve bodies are symmetrical and are equal in quantity, and each of the slits is located between every two adjacent claws.

6. The electromechanical free prompt light of claim 5, wherein each of the reflecting plates comprises at least one opening, and the reflecting plates are embedded through the openings to form a radial form.

7. The electromechanical free prompt light of claim 1, wherein each of the reflecting plates comprises at least one opening, and the reflecting plates are embedded through the openings to form a radial form.

8. The electromechanical free prompt light of claim 1, wherein the light sources are disposed on the platform, and emit light beams away from the platform.

9. The electromechanical free prompt light of claim 1, wherein the carrier base further comprises a plurality of circuit boards respectively located in the direction divided regions and erecting on the platform, and the light sources are respectively disposed on the circuit boards and emit light beams away from the main body.

10. The electromechanical free prompt light of claim 1, wherein the surface of the direction divider is coated by a reflective film.

11. The electromechanical free prompt light of claim 1, further comprising a lampshade, which is connected to a periphery of the platform and covers the direction divider and the light sources.

12. The electromechanical free prompt light of claim 1, wherein each of the light sources is a light emitting diode (LED).

* * * * *